United States Patent
Sugawara et al.

(10) Patent No.: US 6,778,930 B2
(45) Date of Patent: Aug. 17, 2004

(54) SYSTEM FOR REDUCING DISTORTION OF SIGNALS TRANSMITTED OVER A BUS

(75) Inventors: Takashi Sugawara, Machida (JP); Hirohide Komiyama, Zama (JP)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 10/113,316

(22) Filed: Mar. 29, 2002

(65) Prior Publication Data

US 2002/0173925 A1 Nov. 21, 2002

(30) Foreign Application Priority Data

Mar. 30, 2001 (JP) ........................................ 2001-102341

(51) Int. Cl.⁷ ........................ G06F 19/00; G06F 13/28; G06F 13/14
(52) U.S. Cl. ..................... 702/107; 455/238.1; 710/22; 710/305
(58) Field of Search ............................ 702/7, 107, 117, 702/123; 714/714; 324/339; 327/170; 375/347; 330/2; 710/22, 35, 100, 305; 455/238.1

(56) References Cited

U.S. PATENT DOCUMENTS

| | | | | |
|---|---|---|---|---|
| 5,453,716 A | * | 9/1995 | Person et al. | 330/2 |
| 5,483,692 A | * | 1/1996 | Person et al. | 455/238.1 |
| 6,175,883 B1 | * | 1/2001 | Kvamme et al. | 710/22 |
| 6,429,708 B2 | * | 8/2002 | Asano et al. | 327/170 |
| 6,606,678 B1 | * | 8/2003 | Nakamura | 710/305 |

OTHER PUBLICATIONS

Japanese Publication—PUPA8 (1996) 272733.
Japanese Publication—PUPA8 (1995) 281992.

* cited by examiner

*Primary Examiner*—John Barlow
*Assistant Examiner*—John Le

(57) ABSTRACT

A computer system measures bus signal distortion and then adjusts certain characteristics of the signal transmitted over the bus, or adjusts other characteristics of the bus or the load on the bus so that signal distortion is reduced. Distortion characteristics that may be measured include signal voltage overshoot and undershoot, and data setup and hold times. Characteristics of the signal and the system that may be adjusted include changing the slew rate of the signal, changing the data setup and hold times, and changing the load impedance on the bus.

4 Claims, 15 Drawing Sheets

[Figure 1]
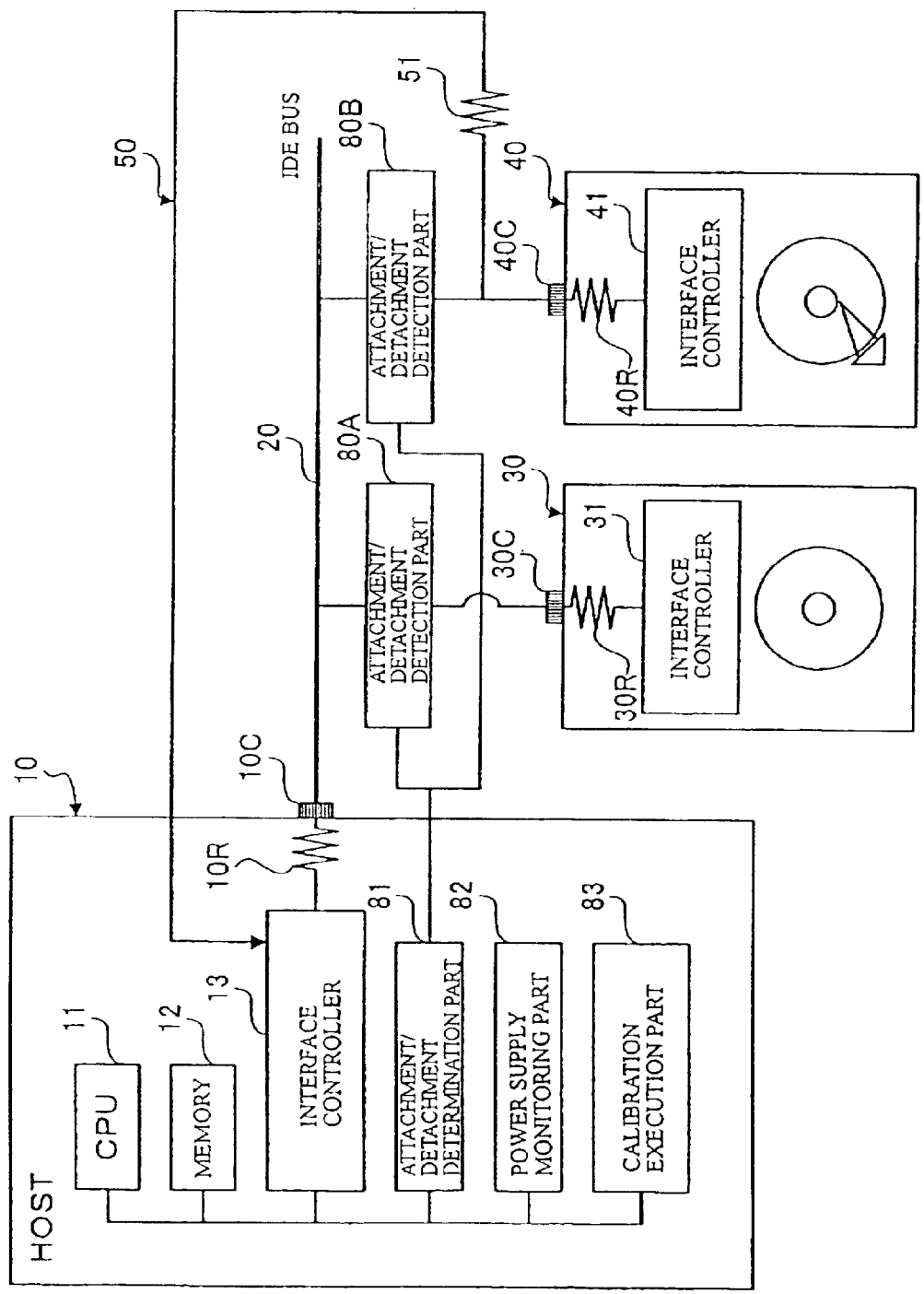

[Figure 2]
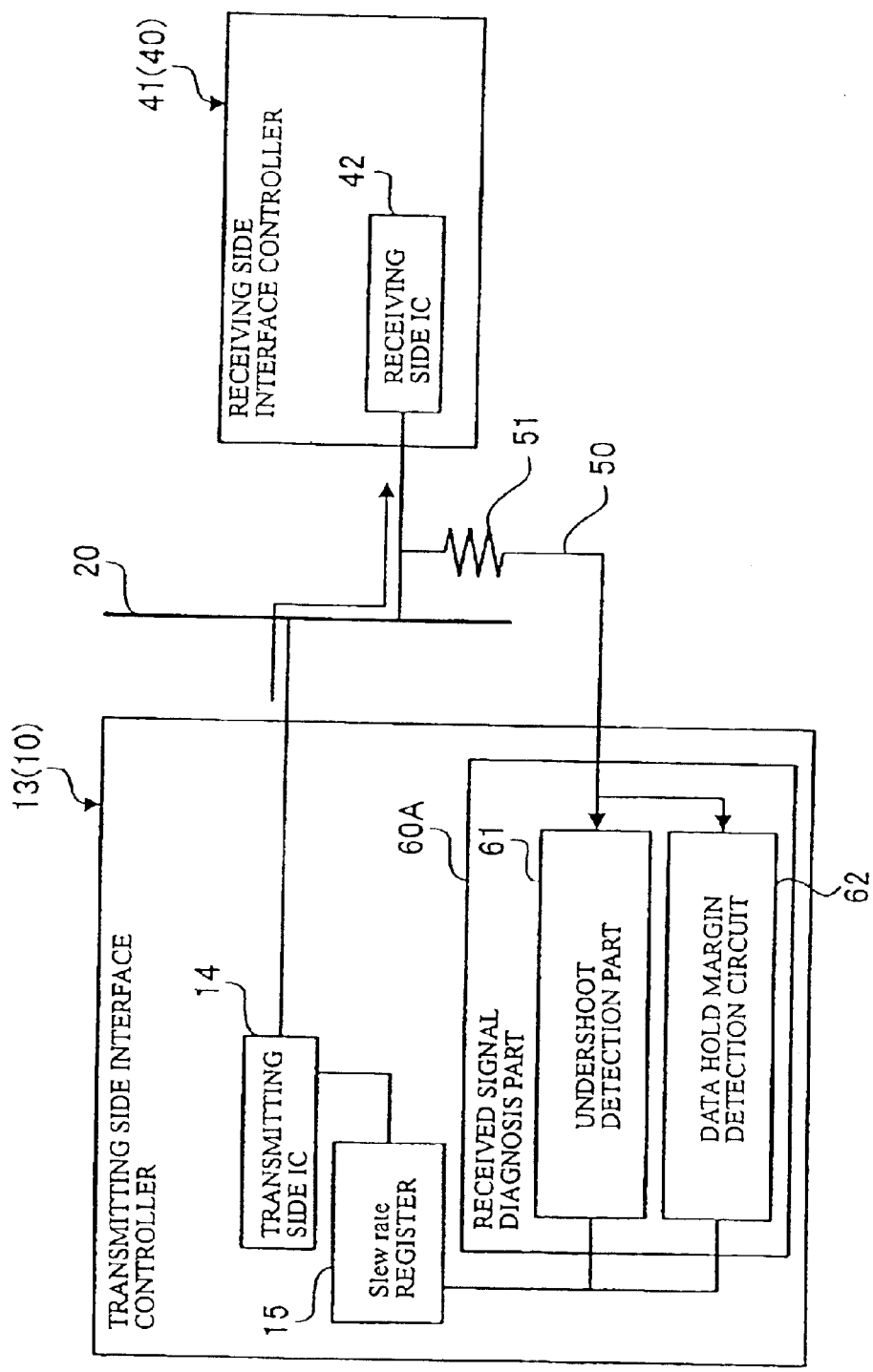

[Figure 3]
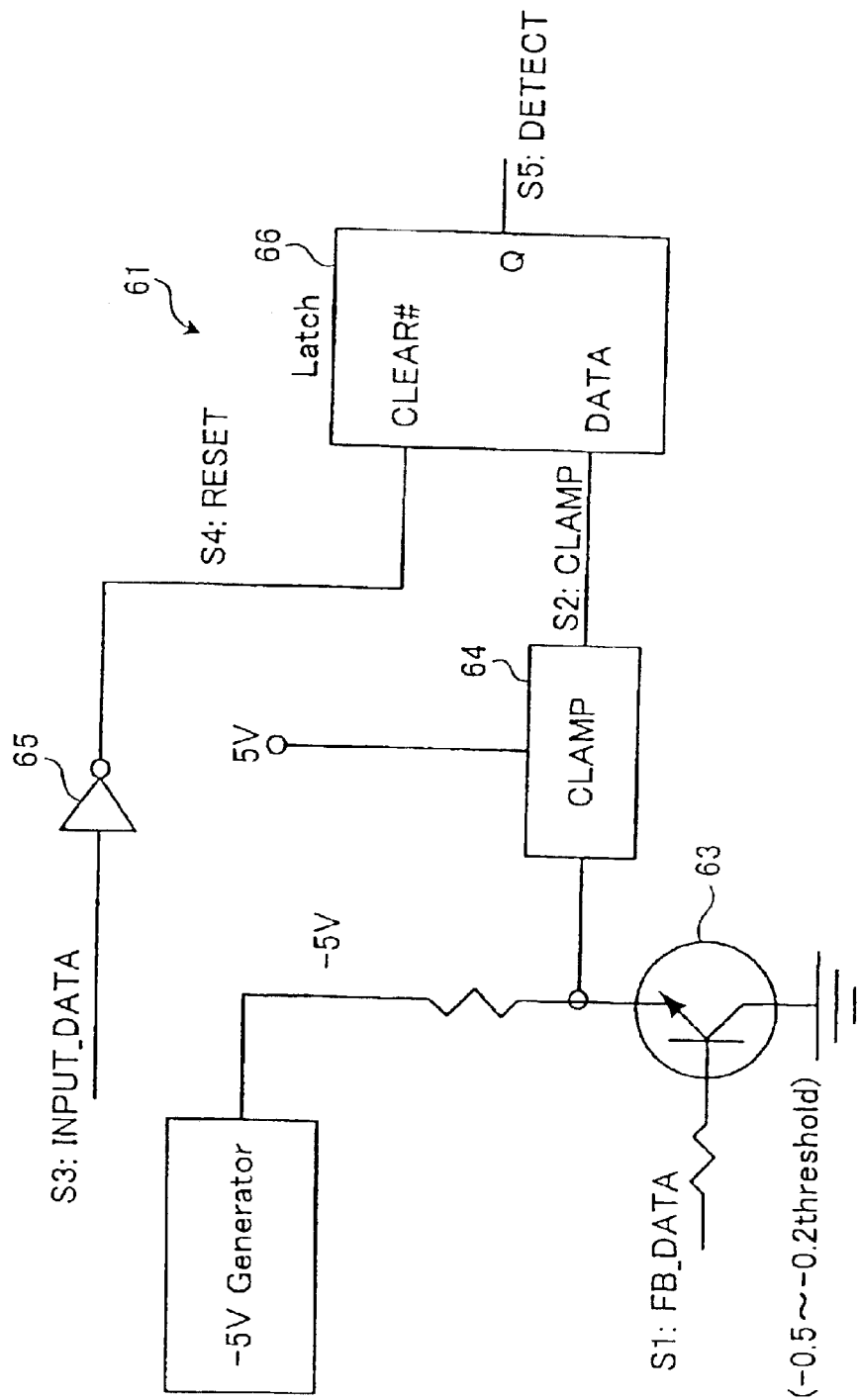

[Figure 4]
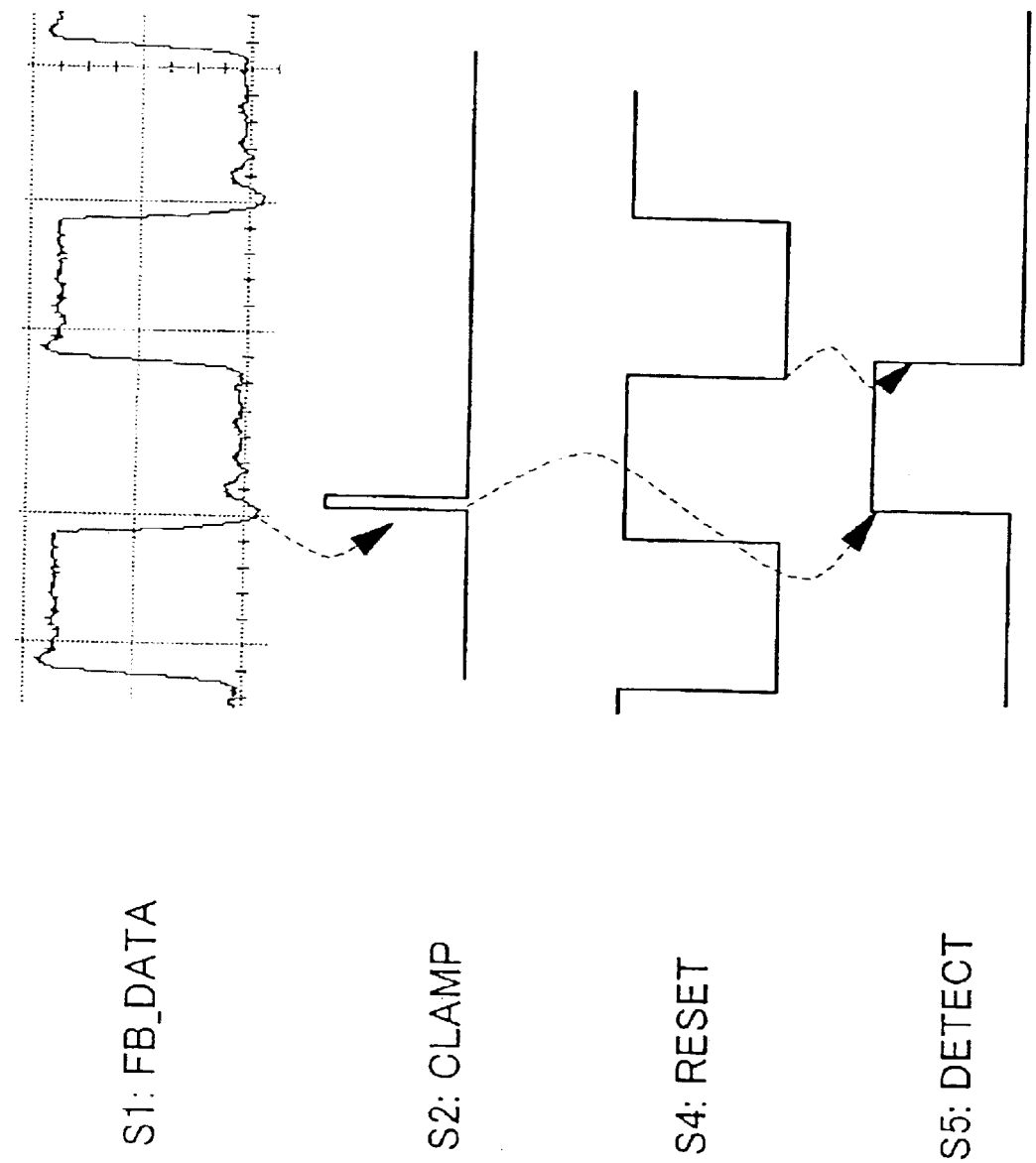

[Figure 5]
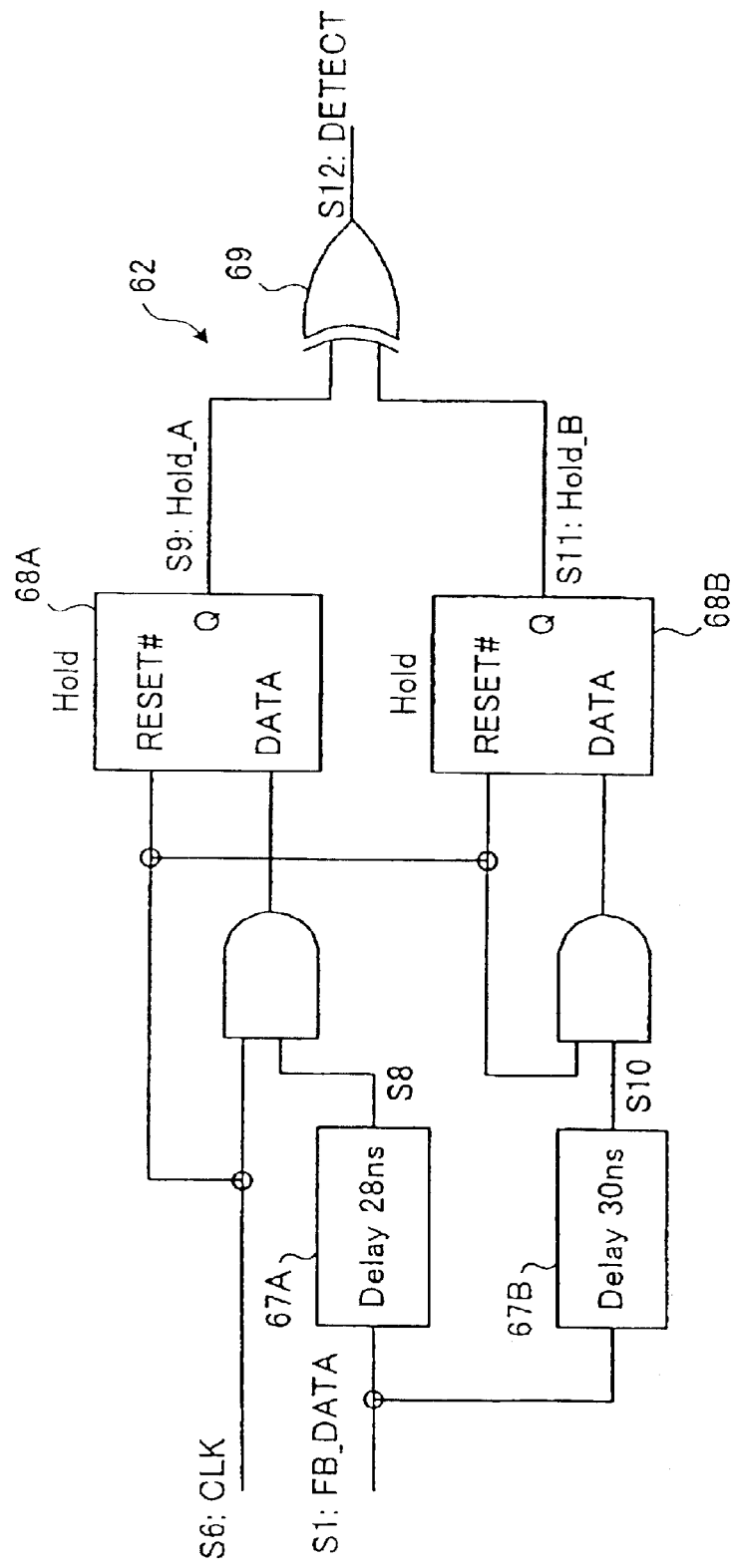

[Figure 6]
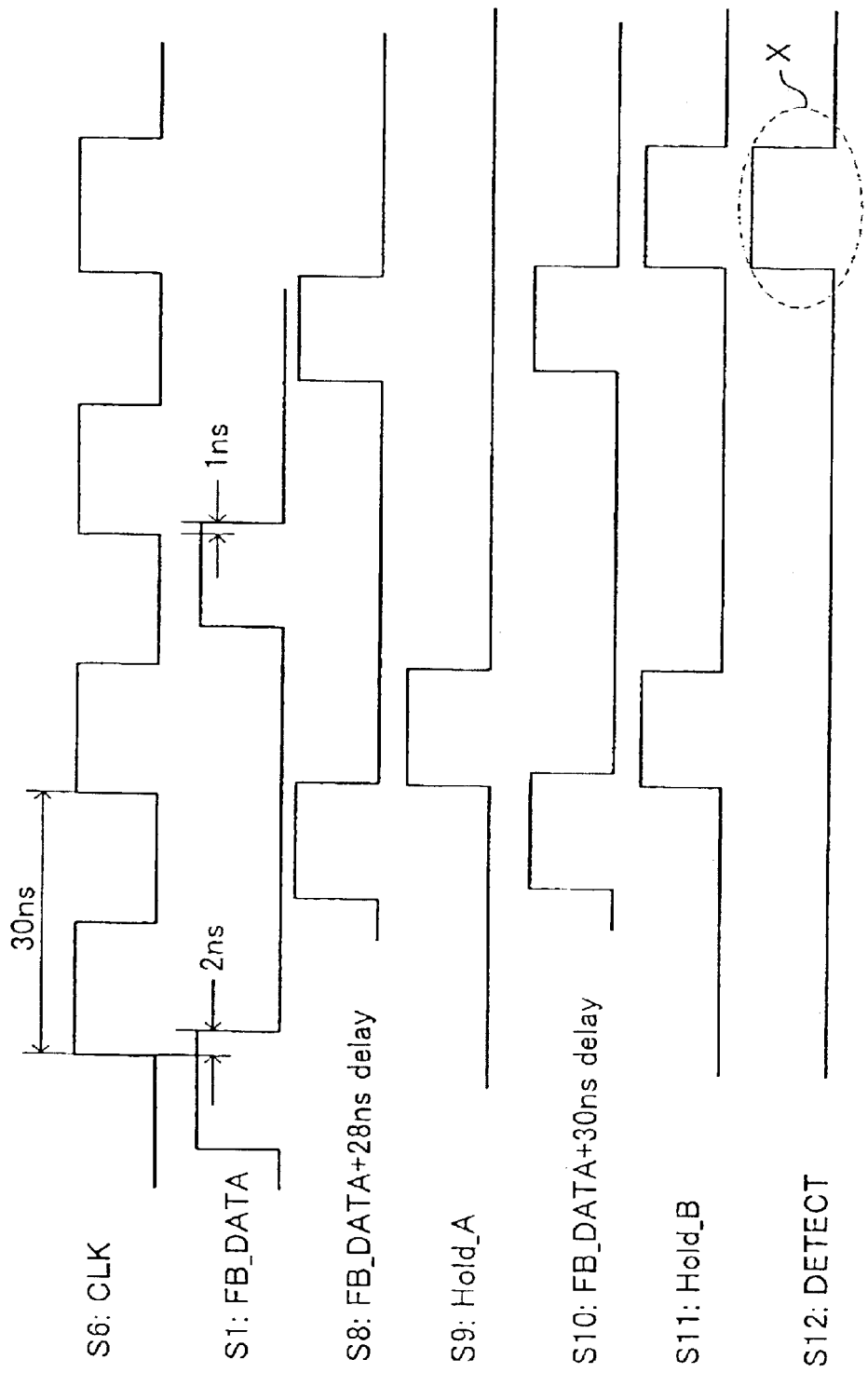

[Figure 7]
(a)
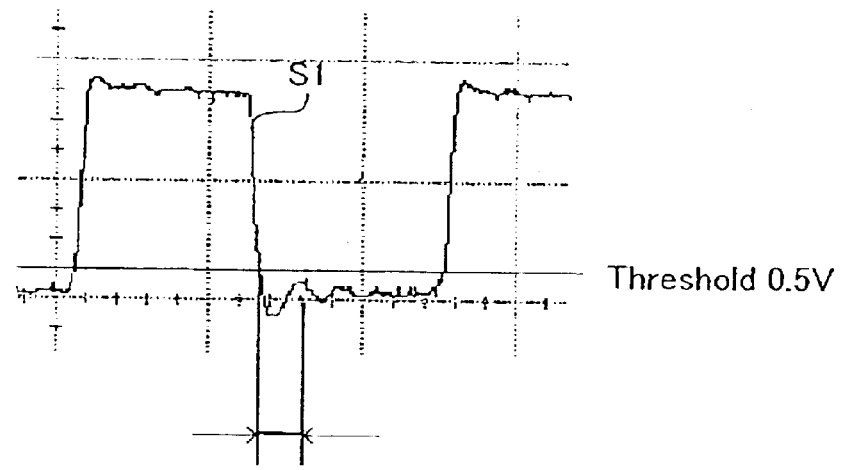
Threshold 0.5V
(b)
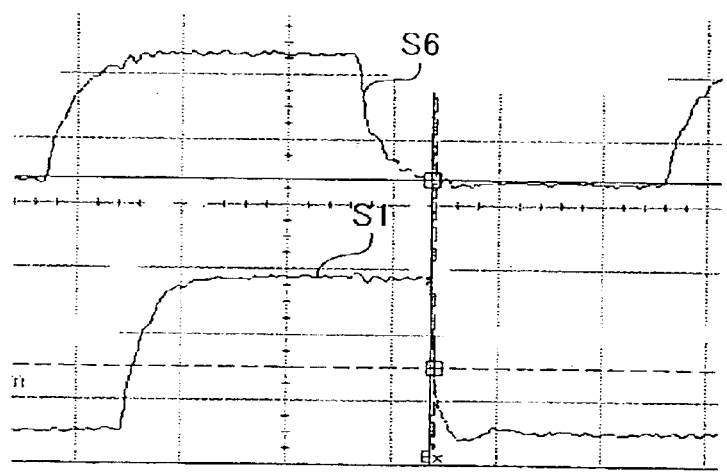
(c)
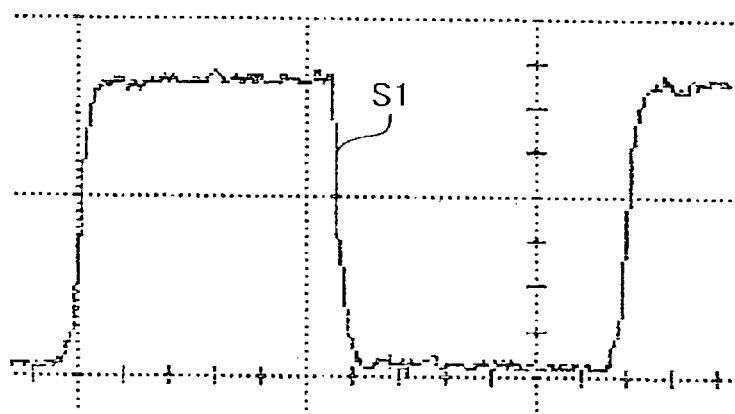

[Figure 8]
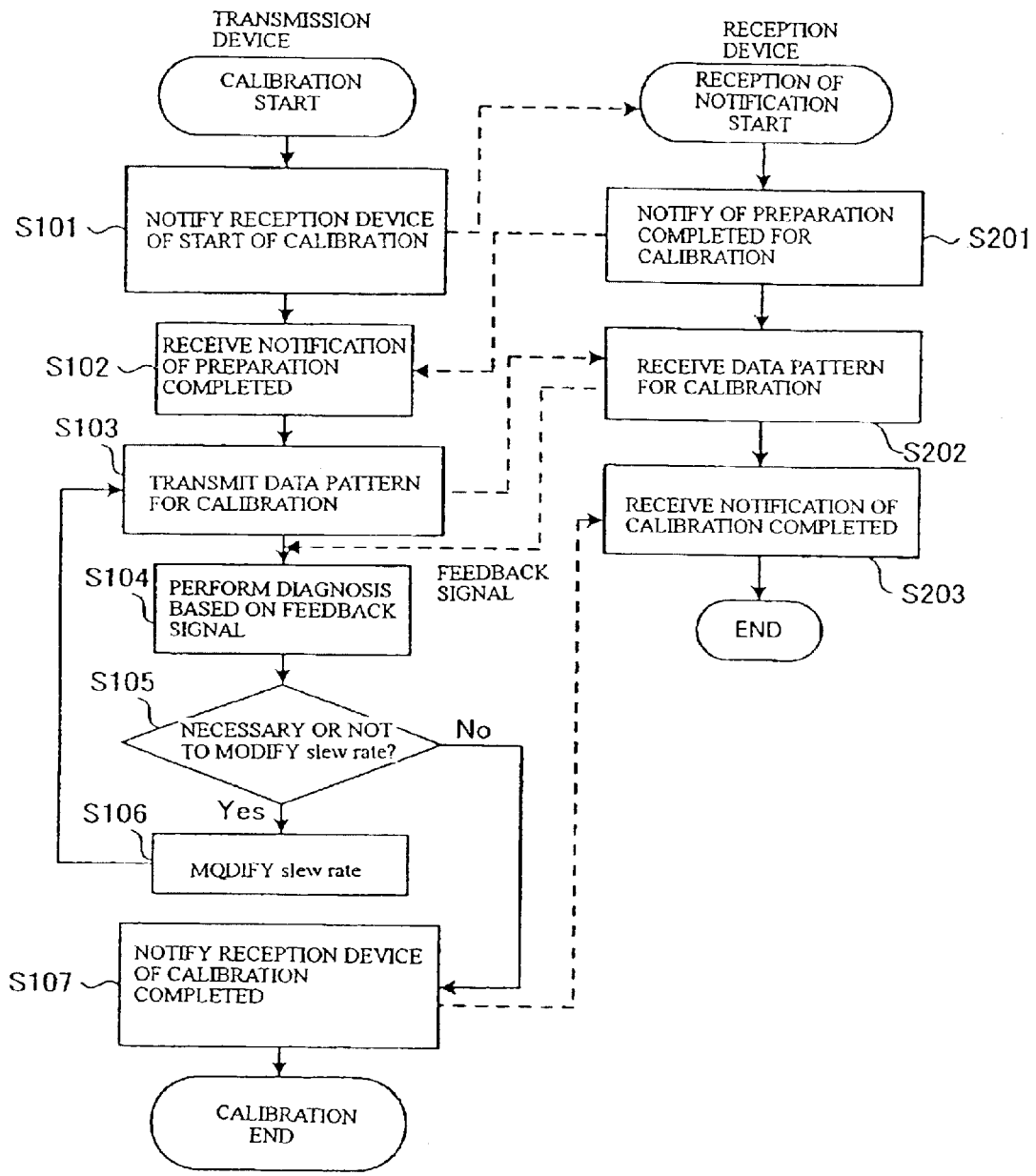

[Figure 9]
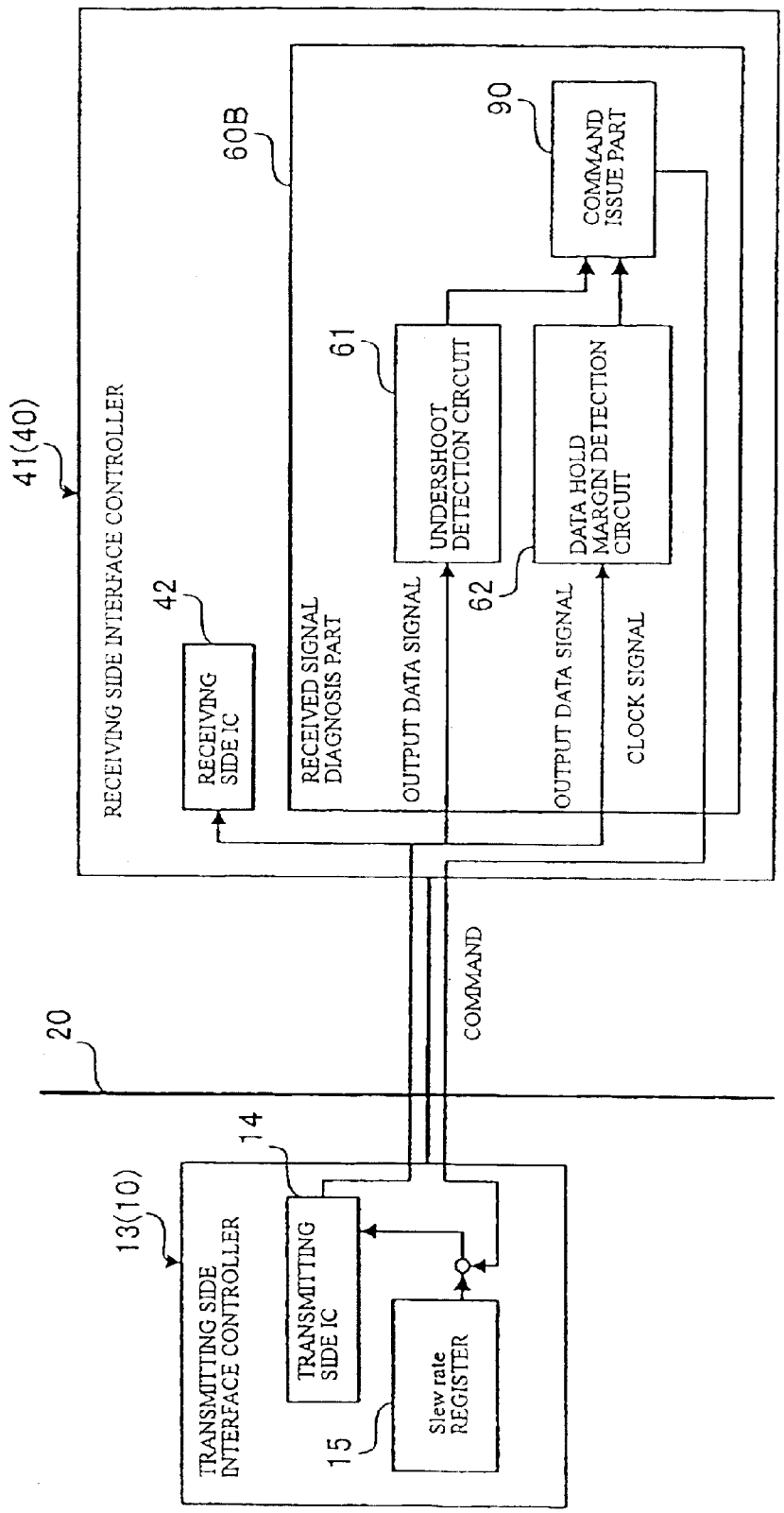

[Figure 10]
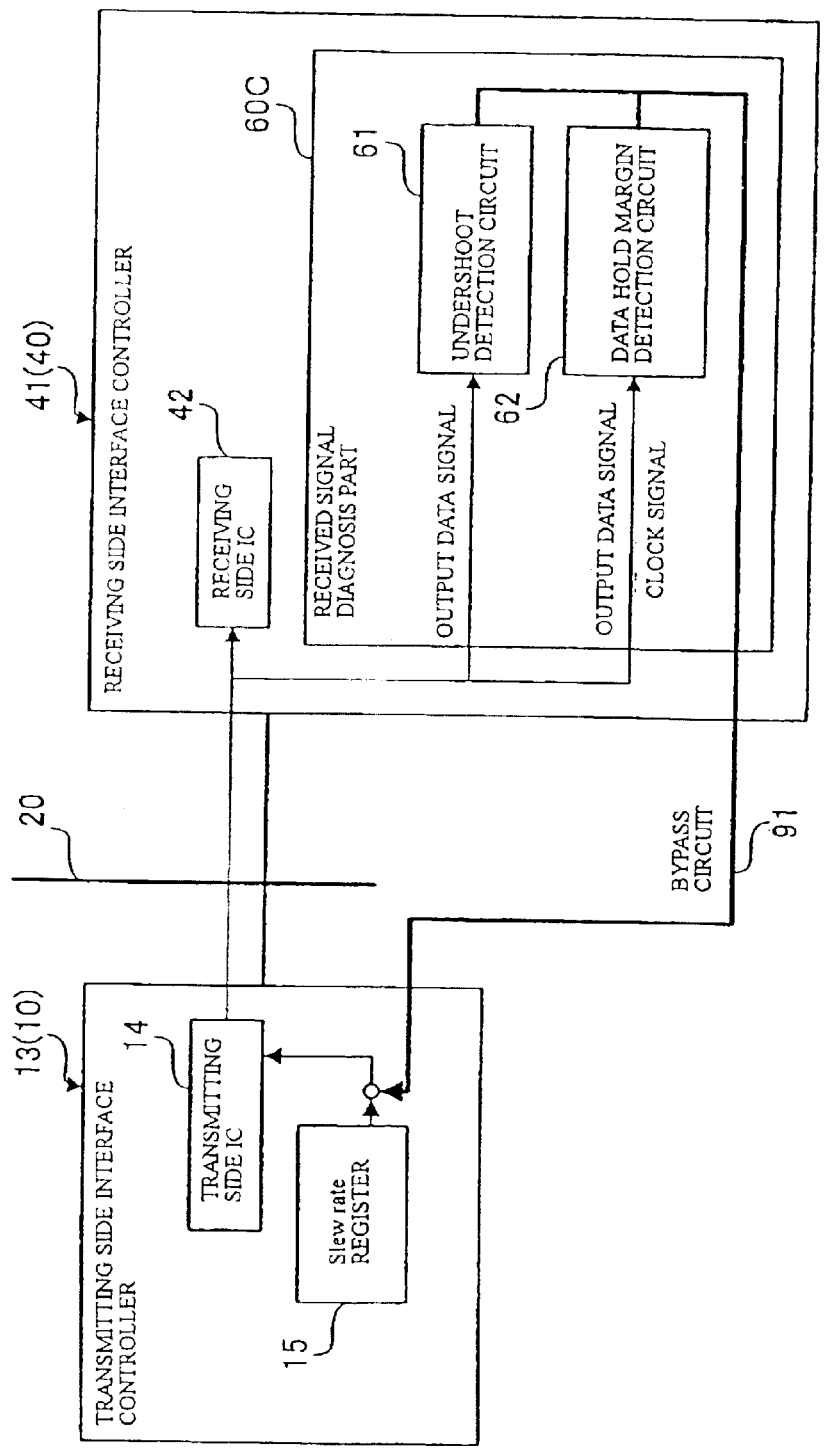

[Figure 11]
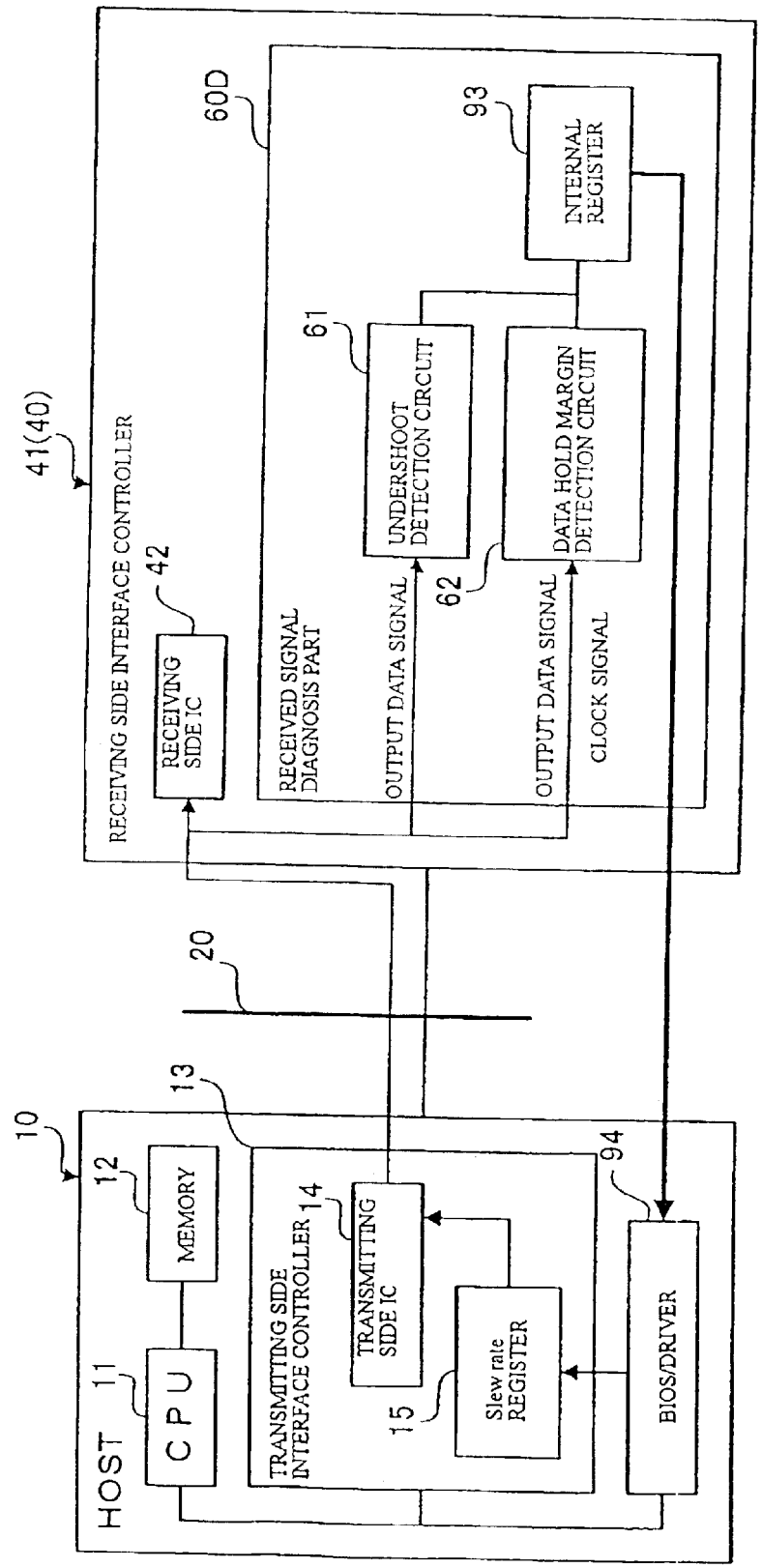

[Figure 12]
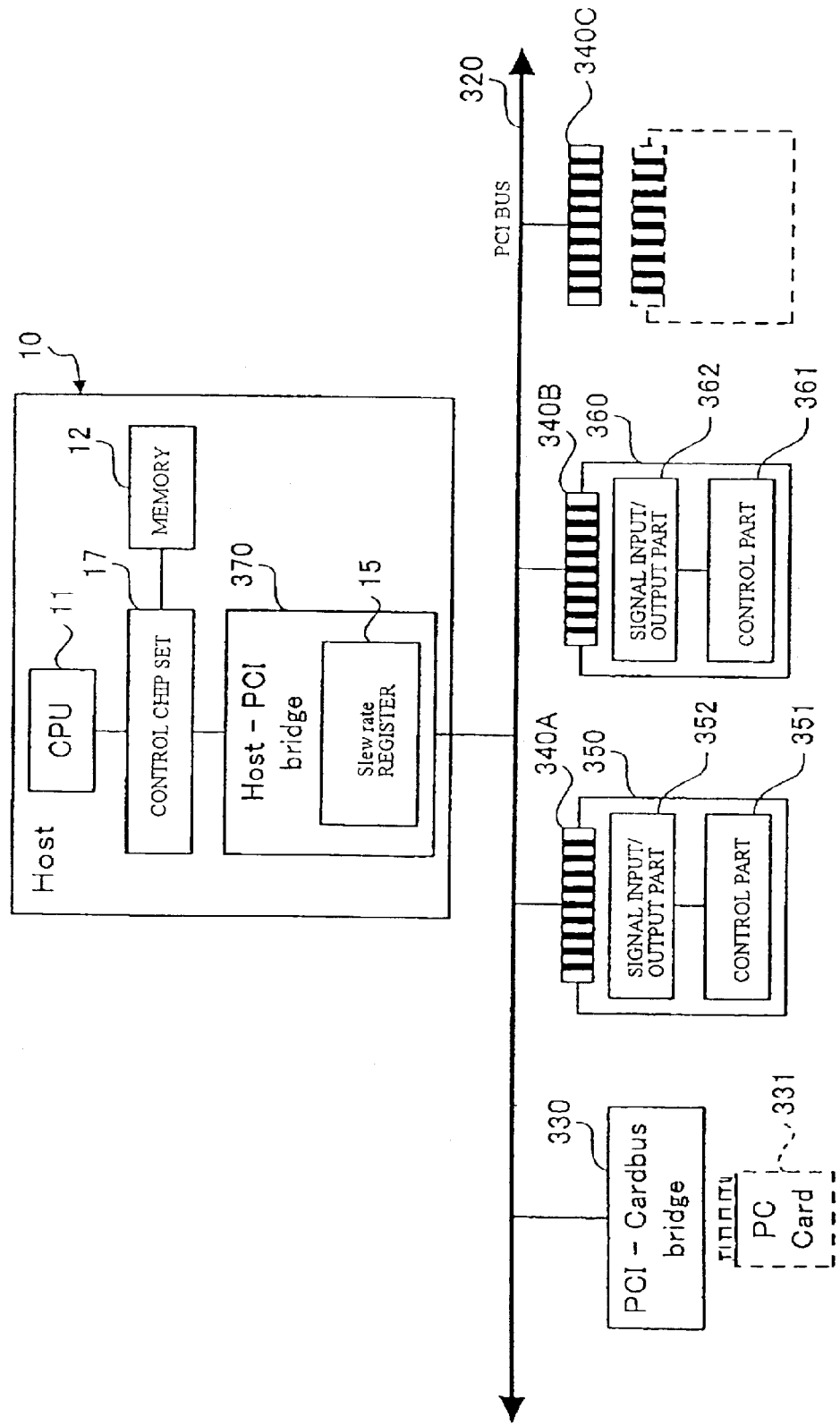

[Figure 13]
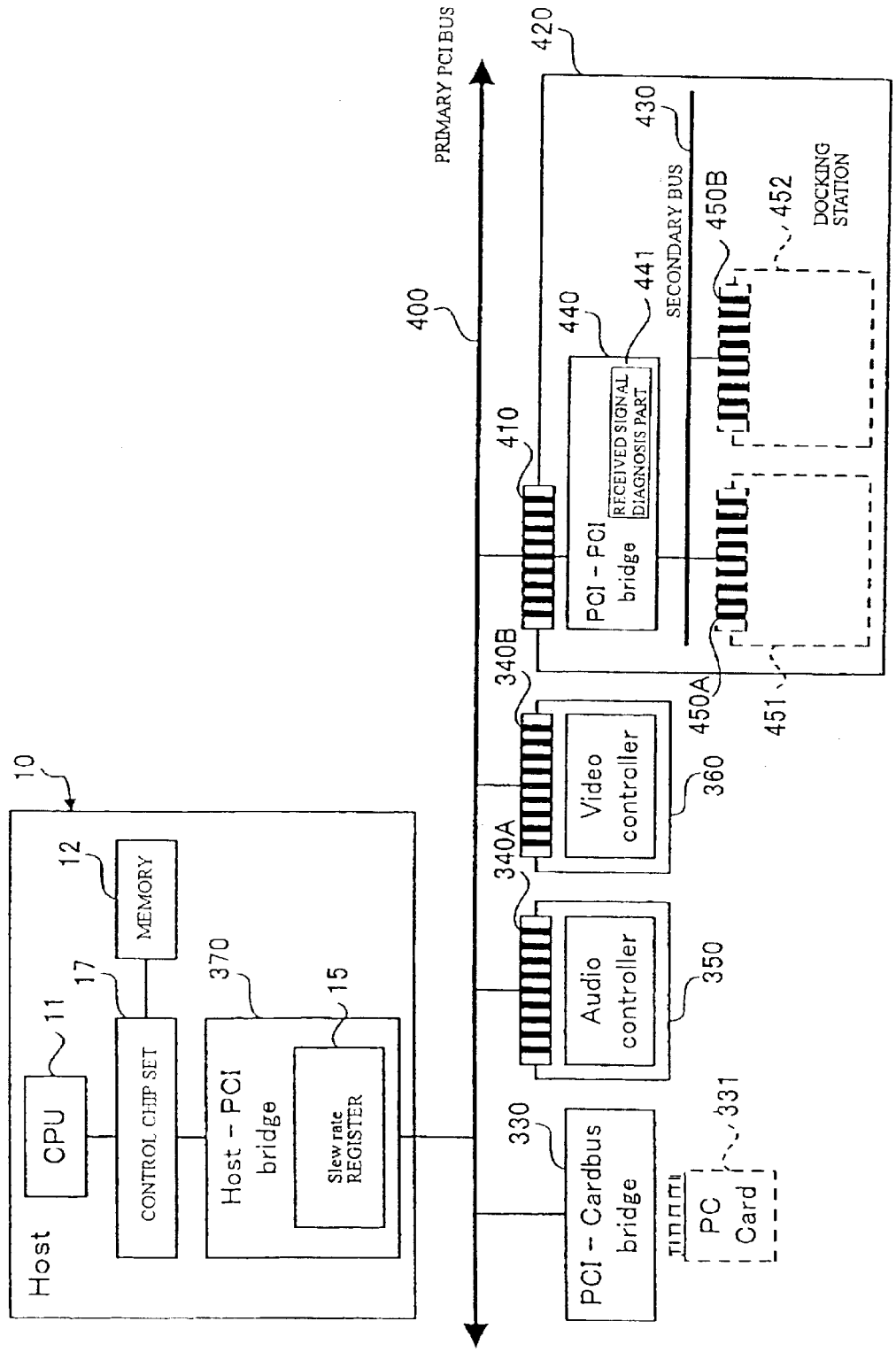

[Figure 14]
(a)
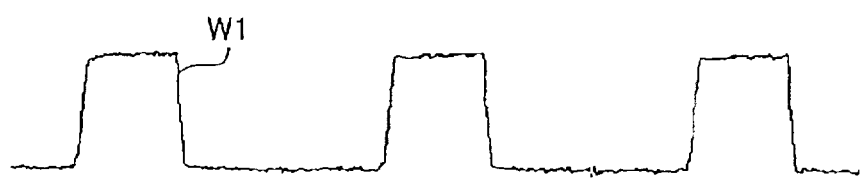
(b)
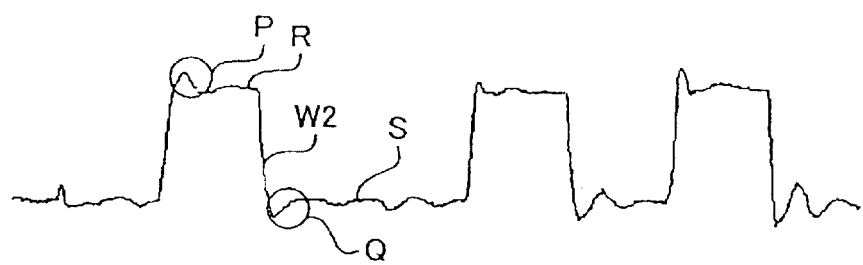
(c)
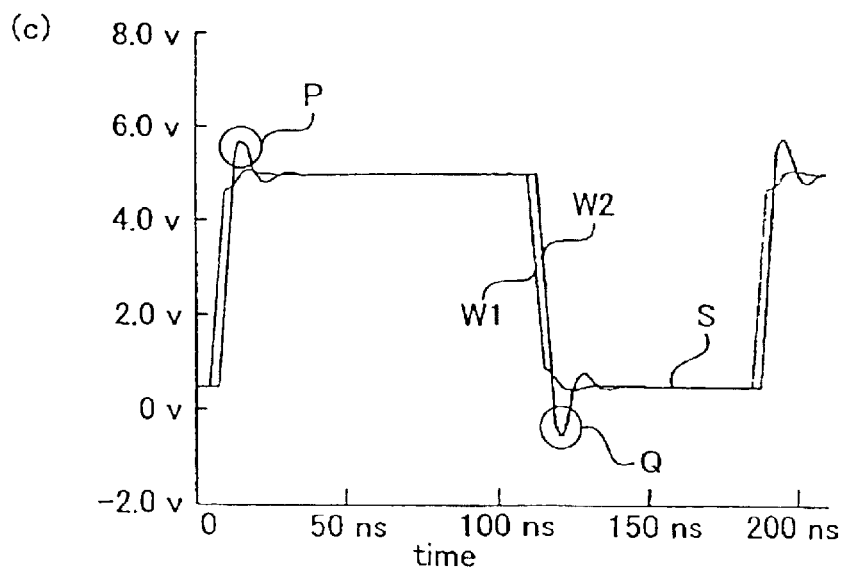

[Figure 15]
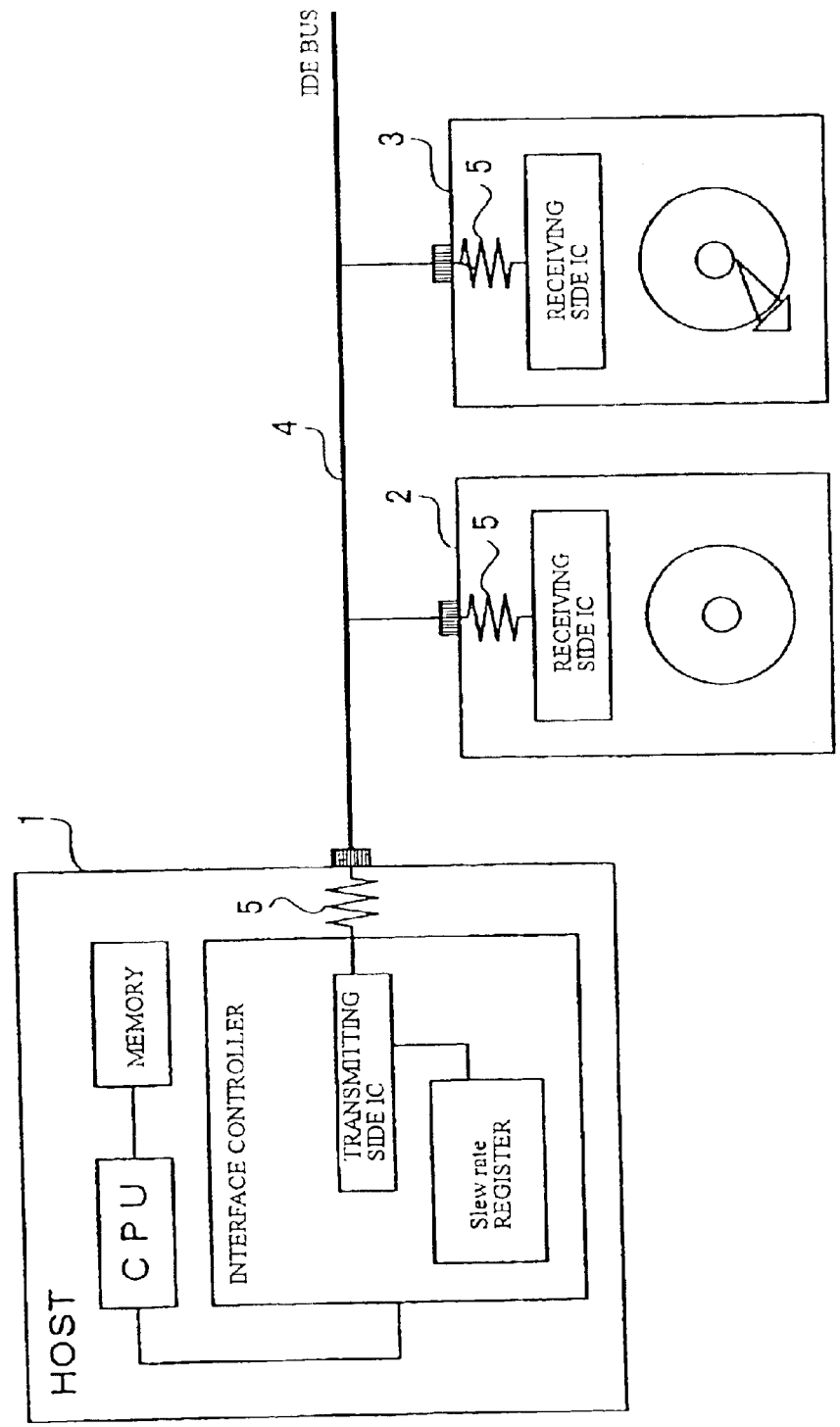

SYSTEM FOR REDUCING DISTORTION OF SIGNALS TRANSMITTED OVER A BUS

BACKGROUND OF THE INVENTION

Applicants claim the benefits of foreign priority under 35 U.S.C. 119 of Japanese Application 2001-102341 filed Mar. 30, 2001. This Japanese application and its translation are incorporated by reference into this application.

This invention pertains to computers and other data processing systems and, more particularly, to a system that measures some aspect of bus signal distortion and, in response to that measurement of signal distortion, adjusts certain characteristics of the signals transmitted over the bus, or adjusts certain characteristics of the bus or the loads on the bus, so that signal distortion is reduced.

The power of host processors or "central processing units" (CPU's) has increased significantly in recent years. At the same time, the storage capacity of devices such as hard disk drives (HDD) and random access memory (RAM) has also increased. Consequently, the shear volume of data to be processed in a computer has increased dramatically, thereby requiring a corresponding increase in the data transfer rate between the various components of a computer.

In a personal computer (PC), storage devices such as a hard disk drive (HDD), a compact disc read only memory (CD-ROM), and various other peripheral devices such as audio and video adapters, are connected to a host processor board having a CPU and RAM (commonly called a "mother board") through one or more peripheral buses such as the Integrated Device Electronics (IDE) bus or the Peripheral Component Interconnect (PCI) bus.

In a PC, the data transfer rate between the CPU and RAM is usually significantly higher than the data transfer rate between the mother board and the various peripheral components, which are usually interconnected to the mother board through one or more peripheral buses. Thus, the transfer of data across one of these peripheral buses is a bottleneck and, to alleviate this problem, improvements to these buses have been introduced over the years that raise the standard data transfer rate over the bus. For example, the standard data transfer rate for the IDE bus in AT attachment (ATA) has increased year by year, from 16 MB/sec, to 33 MB/sec, 66 MB/sec and 100 MB/sec. But as the data transfer rate over these peripheral buses increases, distortion in the waveform of the data signals also increases, which may result in a data transfer error.

FIG. 14a shows the waveform W1 of an exemplary signal transmitted from the transmit side, and FIG. 14b illustrates the waveform W2 of the signal on reception at the receive side. The waveform W2 has an overshoot in the rising edge (labeled P in FIG. 14b), and an undershoot in falling edge (labeled Q). As a result of this ringing, the signal takes a certain time to settle to a constant value such as high level R or low level S in FIG. 14b.

One of the causes of waveform distortion is related to the bus cables that carry the signal between the host and the peripheral device. Therefore, for signal waveform stabilization, specifications such as the number of pins in the bus cable or the configuration of the ground lines are sometimes modified when the standard of data transfer rate for the bus is changed.

Another cause of waveform distortion is related to electrical compatibility between a host device 1 and peripheral devices 2 and 3, as shown in FIG. 15. Specifically, the peripheral devices 2 and 3 (e.g., storage devices such as HDD, CD-ROM, and audio and video controllers) have different electrical loads depending on their kind and type. Accordingly, when data is transferred from host device 1 through bus 4 to peripheral devices 2 and 3, the signal waveforms may be distorted because of the electrical loads of the peripheral devices on the receiving side. Typically, terminating resistors 5 are pre-inserted into host device 1 and peripheral devices 2 and 3 prior to the shipment, so that the electrical load balance depends on the combination of the particular host device 1, and the particular peripheral devices 2 and 3 that are attached to bus 4.

However, many PC systems are configured according to the purchaser's specifications, so that many different types, makes and models of peripheral devices can be attached to the bus. Since each one of these different types, makes and models of peripheral devices can have different load characteristics, and since there is a very large number of possible combinations of these various peripheral devices that can be attached to the bus, it is difficult and not cost effective to change the termination resistor 5 for each such combination of type, make and model of peripheral device attached to the bus. In addition, If a user attaches a peripheral device to the bus, thereby changing the configuration of the PC system from the way it was originally shipped to the end user, the bus signal waveform may be distorted because of the change in the electrical load on the bus, and it is difficult for the user to change or adjust the termination resistor to reduce signal distortion.

Accordingly, the invention described below overcomes many of these disadvantages of the prior art computer system by measuring bus signal distortion and then adjusting certain characteristics of the signal transmitted over the bus, or adjusting other characteristics of the bus or the loads on the bus so that signal distortion is reduced.

SUMMARY OF THE INVENTION

According to such an object, in a data transfer apparatus of the present invention, data signal that is transmitted by a signal transmission means and transferred through a bus is received by a signal reception means. Then, the signal received by the signal reception means is diagnosed by a signal diagnosis means and a characteristic of the signal received by the signal reception means is adjusted based on the diagnosis result by a signal adjustment means.

The characteristic of a signal to be adjusted may be at least one selected from an overshoot at a pulse rising, an undershoot at a pulse falling, a data setup time and a data hold margin in the signal at the receiving side. Alternatively, it may also be a signal reflection or the like.

The signal adjustment means preferably adjusts the characteristic of the signal received by the signal reception means, by adjusting a slew rate of the signal at the receiving side. Alternatively, it may adjust the characteristic of the signal by adjusting a resistance value of a terminating resistor at one or both of the signal transmission means and the signal reception means.

The signal at the receiving side can thus be stabilized by adjusting the characteristic of the signal at the receiving side.

Specifically, the signal received by the signal reception means may be fed back to the signal transmission means through a feedback circuit, and the feedback signal may be diagnosed by the signal diagnosis means at the signal transmitting side, and the characteristic of the transmitted signal may be adjusted by the signal adjustment means.

Instead of diagnosing the signal at the signal transmitting side, the signal diagnosis means may be provided in the signal reception means. In this case, diagnosis information obtained by diagnosing the signal may be outputted at the signal diagnosis means, and the characteristic of the signal may be adjusted by the signal adjustment means provided in the signal transmission means, based on the outputted diagnosis information. In this case, a command corresponding to the diagnosis result may also be transferred as the diagnosis information through the bus to the signal adjustment means, and the characteristic of the signal may be then adjusted according to the command. Other than the bus, a diagnosis information transfer circuit may be disposed between the signal diagnosis means and the signal adjustment means, and a signal representing the diagnosis result may be transferred to the signal adjustment means through the diagnosis information transfer circuit. Additionally, the diagnosis information at the signal diagnosis means may be stored in a diagnosis information storage memory such as a register, and the diagnosis information may be read out from the diagnosis information storage memory by a signal characteristic information update means, and information related to the characteristic of the signal transmitted by the signal transmission means, for example, information in a signal characteristic information storage memory in which a set value of a slew rate is stored, may be updated based on the read out diagnosis information. Accordingly, since the signal transmission means refers to the updated information stored in the signal characteristic information storage memory in the signal transmission, characteristics such as a slew rate are adjusted in signal transmission.

The diagnosis information includes information that shows whether it is necessary or not to update the information related to the signal characteristic, and, if necessary, whether the set value is to be incremented or decremented.

The present invention includes a computer system in which a host part and a peripheral device are connected through a bus, characterized in that a host part comprises a signal transmission part for transmitting a signal to the bus, and a slew rate adjustment part for adjusting a slew rate of the transmitted signal, and the peripheral device has a signal reception part for receiving the signal from the bus, and the host part or the peripheral device further comprises a signal waveform diagnosis part for diagnosing the waveform of the signal received at the signal reception part.

While such a configuration is directed to a signal transfer from the host part to the peripheral device, another configuration may be used in which the peripheral device comprises a device side signal transmission part for transmitting a signal to the bus, and a device side slew rate adjustment part for adjusting a slew rate of the transmitted signal, and the host part comprises a host side signal reception part for receiving the signal from the bus, and the peripheral device or the host part may comprise a host side signal waveform diagnosis part. A similar arrangement is used for a signal transfer from the peripheral device side to the host part side. In other words, in this case, the host part and the peripheral device are configured such that each of the host part and the peripheral device has both of a signal reception function and a signal transmission function. Accordingly, this allows adjustment of a signal received at the receiving side for both of the case where the signal is transferred from the host part to the peripheral device and the case where the signal is transferred from the peripheral devices to the host part.

The computer system may comprise a calibration execution part for executing a calibration process with a predetermined timing in starting up or the like. In the calibration process, a predetermined signal, for example a signal for calibration with continuous variation is transmitted by the signal transmission part, and a waveform of the signal received by the signal reception part of the peripheral device is diagnosed by the signal waveform diagnosis part. A slew rate of the signal transmitted by the signal transmission part is then adjusted by the slew rate adjustment part based on the diagnosis result. Such calibration can provide signal stabilization.

Particularly, when attachment of the peripheral device to the bus is detected, the calibration process can provide signal adjustment depending on the electrical load of the attached peripheral device.

The present invention also includes a computer system characterized in that a slew rate of the signal outputted by the host part is adjusted based on a waveform of a signal that is detected at an interface when the signal is outputted from the host part.

A peripheral device (device) attached to the interface may also comprise a waveform diagnosis part for performing diagnosis based on a waveform of the signal outputted from the host part. It may further comprise a correction information output part to deliver information for correcting a waveform of a signal received at the device based on a diagnosis result by the waveform diagnosis part to the computer system.

Such a configuration may also be used in which a docking station attachable to an interface of the computer system comprises a docking station bus (internal bus) connected to a bus through the interface, a docking station connector for attaching a peripheral device to the docking station bus, and a waveform diagnosis part for performing diagnosis based on a waveform of a signal received on the docking station bus. In this case, it may also comprise a correction information output part to deliver information for correcting a waveform of a signal received at the device based on diagnosis by the waveform diagnosis part to the computer system.

BRIEF DESCRIPTION OF THE DRAWINGS

FIG. 1 is a block diagram a computer system according to a first embodiment of the present invention;

FIG. 2 is a detailed block diagram of the transmit side controller 13 and receive side controller 41 of FIG. 1, wherein a diagnostic unit 60A is provided in the transmit side controller;

FIG. 3 is a schematic diagram of a logic circuit for detecting an undershoot of a signal waveform;

FIG. 4 is a timing diagram illustrating the waveforms of four signals measured at various points in the logic circuit of FIG. 3;

FIG. 5 is a schematic diagram of a logic circuit for detecting data signal hold margin;

FIG. 6 is a timing diagram illustrating the waveforms of seven signals measured at various points in the logic circuit of FIG. 5;

FIGS. 7a–7c are waveforms of: (a) a data signal with an undershoot that exceeds a predetermined range, (b) clock and data signals wherein the data hold margin exceeds a predetermined range, and (c) a data signal obtained by an adjustment of slew rate;

FIG. 8 is a flow chart of a calibration process;

FIG. 9 is a detailed block diagram of the transmit side controller 13 and receive side controller 41 of FIG. 1, wherein a diagnostic unit 60B is provided in the receive side controller, and a command is transmitted back to the transmit side controller indicative of the diagnostic results;

FIG. 10 is a detailed block diagram similar to FIG. 10, but wherein the diagnostic result is conveyed back to the transmit side controller via a bypass circuit 91.

FIG. 11 is a detailed block diagram similar to FIG. 10, but wherein the diagnostic result is stored in a register 93;

FIG. 12 is a block diagram of a computer system comprising a PCI bus according to a second embodiment of the present invention;

FIG. 13 shows a configuration of a computer system comprising a docking station according to a third embodiment of the present invention;

FIGS. 14a–14c are waveforms of: (a) a data signal at the transmit side, (b) a data signal at the receive side illustrating overshoot and undershoot, and (c) the transmit side and receive side signals overlaid; and FIG. 15 is a block diagram of a conventional personal computer system.

DESCRIPTION OF THE ILLUSTRATIVE EMBODIMENTS

The present invention will now be described in more detail with reference to a first to third embodiments of the invention shown in the accompanying drawings.

First Embodiment

FIG. 1 is a diagram illustrating a schematic configuration of a PC system (computer system, data transfer apparatus) according to this embodiment. In the example shown in FIG. 1, IDE bus is used as a bus.

The PC system shown in FIG. 1 is configured such that as peripheral devices (devices), for example a CD-ROM drive 30 and a hard disk drive (HDD) 40, are connected via IDE bus (bus) 20 to a host part 10 having CPU 11 (the center) and a memory 12 such as RAM to temporarily store data to be processed at the CPU 11.

The host part 10, CD-ROM drive 30, and HDD 40 have respective terminating resistors 10R, 30R and 40R at respective portions of connectors 10C, 30C and 40C associated with the IDE bus 20.

The host part 10 is provided with an interface controller (signal adjusting means, a slew rate adjustment part) 13 to send/receive data via the IDE bus 20, to/from the CD-ROM drive 30 and HDD 40.

The CD-ROM drive 30 and HDD 40 comprise respective interface controllers (correction information output parts) 31 and 41 to send/receive data via the IDE bus 20 to/from the host part 10.

The interface controller 13 of the host 10, the interface controller 31 of the CD-ROM drive 30 and the interface controller 41 of the HDD 40 have the essentially same configuration, each having functions for data transmission and reception.

An example for a case where data is transferred from the host part 10 to a peripheral device, for example the HDD 40, will be described.

FIG. 2 shows a minimal configuration in such a case, in which the interface controller 13 of host part 10 is a transmitting side interface controller and the interface controller 41 of the HDD 40 is a receiving side interface controller. As shown in FIG. 1 and FIG. 2, a feedback circuit 50 to take a data signal on its way from the IDE bus 20 to a receiving side IC (signal reception means, a signal reception part) 42 contained in the interface controller 41 of the HDD 40, and to feedback the data to the interface controller 13 of the host part 10 (the data transmitting side), is provided between the IDE bus 20 for carrying the data transferred from the host part 10 and the HDD 40 for receiving the data. The signals taken out by the feedback circuit 50 include a data signal transferred from the host 10 to the HDD 40 (for example DD0) and a reference clock signal transferred from the host part 10 to the HDD 40 for synchronization (for example HSTROBE). The feedback circuit 50 is provided with resistor 51 of, for example 100 ohm, for impedance adjustment.

The interface controller 13 of the host part 10 (the transmitting side) comprises a transmitting side IC (signal transmission means, signal transmission part) 14 to transmit a signal for sending data, a slew rate register (signal characteristic information storage memory) 15 that stores a set value of slew rate for a signal transmitted by the transmitting side IC 14 (voltage shift per unit time: V/microsecond), and a received signal diagnosis part (signal diagnosis mean, signal waveform diagnosis part, waveform diagnosis part) 60A to diagnose a waveform of a feedback signal via the feedback circuit 50. The interface controller 13 modifies the set value of slew rate at the slew rate register 15 as a characteristic of the signal transmitted by the transmitting side IC 14, based on the diagnosis result by the received signal diagnosis part 60A.

The received signal diagnosis part 60A comprises an undershoot detection circuit (circuit) 61 to detect an undershoot of the feedback signal via the feedback circuit 50 and a data hold margin detection circuit (circuit) 62 to detect data hold margin of the feedback signal.

FIG. 3 shows a logic circuit configuration of the undershoot detection circuit 61 and FIG. 4 show an example of a signal obtained in an intermediate stage in the under-shoot detection circuit 61. The undershoot detection circuit 61, using a transistor 63 in which threshold voltage is set depending on a predetermined proper range (−0.5V to −0.2V, for example), and using a clamp (CLAMP) circuit 64, detects presence or absence of signal outputs of −0.5V or more and −0.2V or more in a feedback signal S1 obtained from the feedback circuit 50 (FB_DATA in FIG. 3 and FIG. 4). An output signal S2 (CLAMP in FIG. 3 and FIG. 4) from the clamp circuit 64, and a reset signal S4 (RESET in FIG. 3 and FIG. 4) obtained by inverting with an inverter 65 a signal S3 (INPUT_DATA in FIG. 3) transmitted by the transmitting side IC 14, are latched by a latch circuit 66.

As a result, if undershoot of −0.5V or more is detected in an undershoot detect signal S5 (DETECT in FIG. 3 and FIG. 4) obtained as an output signal (diagnosis information) at the undershoot detection circuit 61, the set value of the slew rate of the slew rate 15 is decremented by one step at the received signal diagnosis part 60A. If undershoot of −0.2V or more is not detected in the undershoot detect signal S5 (DETECT in FIG. 3 and FIG. 4) obtained as an output signal (diagnosis information) at the undershoot detection circuit 61, the set value of the slew rate of the slew rate 15 is incremented by one step at the received signal diagnosis part 60A. Thus, the slew rate of the signal transmitted from the transmitting side IC 14 is modified depending on the undershoot of the feedback signal via the feedback circuit 50.

FIG. 5 shows a logic circuit configuration of the data hold margin detection circuit 62, and FIG. 6 shows an example of a signal in an intermediate stage in the data hold margin detection circuit 62. This data hold margin detection circuit 62 obtains a reference clock signal S6 (CLK in FIG. 5 and FIG. 6) from the feedback circuit 50, where the period of the reference clock signal S6 is 30 ns. The data hold margin detection circuit 62 also obtains a feedback signal S1 (FB_DATA in FIG. 5 and FIG. 6) from the feedback circuit 50. Assuming that a proper data hold margin is 2 ns, a first delay (DELAY) circuit 67A obtains a first delay signal S8 (FB_DATA+28 ns delay in FIG. 6) by applying 28 ns delay (the period of the clock signal S6: 30 ns minus proper data hold margin: 2 ns) to the feedback signal S1. Then, a first hold circuit 68A obtains a first hold signal S9 (Hold A in FIG. 5 and FIG. 6) by latching the first delay signal S8 to the reference clock signal S6 from the feedback circuit 50.

A second delay (DELAY) circuit 67B obtains a second delay signal S10 (FB_DATA+30 ns delay in FIG. 6) by applying 30 ns delay corresponding to the period of the reference clock signal, to the feedback signal. A second hold circuit 68B then obtains a second hold signal S11 (Hold_B in FIG. 5 and FIG. 6) by latching the second delay signal S10 to the reference clock signal S6 from the feedback circuit 50.

Then, an Exclusive OR circuit 69 obtains a data hold margin detect signal S12 (DETECT in FIG. 5 and FIG. 6) as an output signal (diagnosis information) by Exclusive ORing of the first hold signal S9 and the second hold signal S11.

In the embodiment of FIG. 6, assuming that in the feedback signal S1 from the feedback circuit 50 the data hold margin in the first pulse is 2 ns that is within a proper range, and the data hold margin of the second pulse is 1 ns that is out of the proper range, a signal pulse X occurs in that portion corresponding to the second pulse of the feedback signal S1, of the data hold margin detect signal S12 obtained at the data hold margin detection circuit 62.

When the signal pulse X is detected in the data hold margin detect signal S12 obtained as an output signal at the data hold margin detection circuit 62, the received signal diagnosis part 60A increments the set value of slew rate of the slew rate register 15 by one step. Accordingly, the slew rate of the signal transmitted from the transmitting side IC 14 is modified depending on the data hold margin of the feedback signal via the feedback circuit 50.

The received signal diagnosis part 60A modifies the set value at the transmitting side slew rate register 15 based on the feedback signal S1 fed back via the feedback circuit 50 in the case of large undershoot as shown in FIG. 7(a), and in the case of small data hold margin as shown in FIG. 7(b). As a result, a signal with a proper waveform as shown in FIG. 7(c) can be obtained in a signal received by the receiving side HDD 40.

While for facilitating the understanding of the description FIG. 1 and FIG. 2 illustrate configurations in which only the HDD 40 is provided with the feedback circuit 50, the CD-ROM drive 30 is also provided with a similar feedback circuit 50 such that the slew rate of a transmission signal is modified based on the similar feedback signal.

The PC system in this embodiment may be configured to allow so-called hot-attachment wherein the CD-ROM drive 30 or the HDD 40 can be attached to/detached from the connector 30C and 40C or the PC system with PC system powered on. In such a configuration, the PC system is provided with attachment/detachment detection parts 80A and 80B consisting of mechanical switches or the like, which respectively detect whether the CD-ROM drive 30 is attached to the connector 30C or not and whether HDD 40 is attached to the connector 40C or not, as shown in FIG. 1. The host part 10 is provided with an attachment/detachment determination part 81 that determines attachment to/detachment from the connector 30C and 40C, of the CD-ROM drive 30 and the HDD 40 based on a change of the detection signals at the attachment/detachment detection part 80A and 80B.

The host part 10 is also provided with a power supply monitoring part 82 that monitors states of a power supply of the PC system, such as turn on of the power supply, transition to sleep mode, and return from a sleep mode to a normal mode. The host part 10 also comprises a calibration execution part 83 that executes a calibration to set a slew rate when predetermined conditions are met. The predetermined conditions for which the calibration is executed include, based on signals from the attachment/detachment determination part 81 and the power supply monitoring part 82 (so-called POS: Power On Selftest), a state right after the PC system is started up with the power on, a state right after the PC system returns from a sleep mode to a normal mode, and a state when it is detected that the CD-ROM drive 30 and the HDD 40 are attached to or detached from the respective connectors 30C and 40C with the PC system powered on.

FIG. 8 shows a process flow of the calibration executed at the calibration part 83. The example in FIG. 8 is also for a case where data is transferred from the host part 10 to a peripheral device such as the HDD 40, corresponding to the example in FIG. 2. Therefore, the host part 10 is a transmission device and the HDD 40 is a reception device.

As shown in FIG. 8, the calibration execution part 83 starts a calibration process when states of the signals from the attachment/detachment determination part 81 and the power supply monitoring part 82 meet predetermined conditions. Then, at first, the host part 10 (the transmission device) notifies the HDD 40 (the reception device) that the calibration starts (step S101).

The HDD 40 having received the notification checks whether the predetermined conditions for executing the calibration are ready or not, and then notifies the host part 10 that a preparation for the calibration is completed (step S201).

The host 10, after receiving the notification from the HDD 40 (the reception device) (step S102), outputs a data pattern for the calibration (predetermined signal) to the HDD 40 through the IDE bus 20 as in normal data transfer (step S103).

While the data pattern transmitted from the host part 10 may be any pattern, in the case of data transfer according to ULTRA-ATA/100 standard for example, it is preferably a strict data pattern with continuous 16 bit width pulse changes of signals like "0000•FFFF•0000•FFFF• . . . ".

When data corresponding to the data pattern for the calibration is outputted from the host part 10 via IDE bus 20, the HDD 40 receives the data (step S202). Then, a feedback signal is inputted from the HDD 40 side through the feedback circuit 50 to the interface controller 13 of the host part 10.

The interface controller 13 diagnoses an undershoot and a data hold margin based on a feedback signal S1 with the undershoot detection circuit 61 and the data hold margin detection circuit 62 in the received signal diagnosis part 60A (step S104).

As a result of the diagnosis, it is determined if a modification of the slew rate is necessary or not (step S105), and if necessary the set value at the slew rate register 15 is modified to modify the slew rate of the signal transmitted from the HDD 40 (step S106), by one step.

The process then returns to the step S103, and the process is repeated until it is determined at the step S105 that modification of the sew rate is unnecessary. When it is determined at the step S105 that modification of the sew rate is unnecessary, the HDD 40 (the reception device) is notified of the end of the calibration (step S107).

With reception of the notification by the HDD 40 (step S203), a series of the steps of the calibration process is completed.

As described above, it is configured such that when a data is transferred via the IDE bus 20 between the host part 10 and the HDD 40 or the CD-ROM drive 30 that are peripheral devices, the signal is fed back via the feedback circuit 50 from the data receiving side to the data transmitting side. And it is configured such that the set value at the transmitting side slew rate register 15 is modified based on the feedback signal. Therefore, it provides reception of signals with a proper waveform at the receiving side, stabilized waveform, and prevention of data transfer errors.

Therefore, it allows elimination of setting of resistor values prior to the shipment, which values depends on peripheral devices combined with the host part 10. It can also provide always a stable performance even if various peripheral devices are combined.

Additionally, it is also configured such that when attachment/detachment of the CD-ROM drive 30 or the HDD 40 is conducted with the PC system powered on, the calibration execution part 83 executes a calibration to modify the set value at the transmitting side slew rate register 15. Therefore, it allows better the so-called hot attachment and can provide always a stable performance.

While, in the first embodiment, it is configured such that a signal is fed back as itself via the feedback circuit 50 from the HDD 40 (receiving side) to the host part 10 (transmitting side) to diagnose if it necessary or not to modify the slew rate at the received signal diagnosis part 60A provided in the host part 10, it may have another arrangement, for example such as an arrangement shown in FIG. 9 to FIG. 11. In following description with respect to FIG. 9 to FIG. 11, different elements than those in the arrangement described above will only be described and same configurations as the aforementioned will not be mentioned with same numerals being assigned to them.

FIG. 9 shows a minimal configuration in which the interface controller 13 of the host part 10 is a transmitting side interface controller and the interface controller 41 of the HDD 40 is a receiving side controller. The receiving side interface controller 41 comprises a received signal diagnosis part (signal diagnosis mean, signal waveform diagnosis part, waveform diagnosis part) 60B.

The received signal diagnosis part 60B comprises a command issue part 90 as well as the undershoot detection circuit 61 and the data hold margin detection circuit 62. The undershoot detection circuit 61 and the data hold margin detection circuit 62 receive an output data signal from the transmitting side IC 14, which is inputted via the IDE bus 20 to the interface controller 41 (, and the data hold margin detection circuit 62 also receives a clock signal).

The command issue part 90 receives output signals from the undershoot detection circuit 61 and the data hold margin detection circuit 62 (undershoot detect signal S5, data hold margin detect signal S12) and determines, based on the signals, whether it is necessary or not to modify the slew rate of the signal that is outputted by the transmitting side IC 14. If it is necessary to modify the slew rate, the command issue part 90 outputs a predetermined command (a command corresponding to a diagnosis result), and transmits the command via the IDE bus 20 to the interface controller 13 of the host part 10.

In the interface controller 13 of the host part 10, the transmitting side IC 14 determines whether it is necessary to modify the slew rate or not, based on the set value of slew rate that is outputted from the slew rate register 15, and on the command issued by the command issue part 90, and if necessary, the signal with a slew rate modified according to the command is outputted by the receiving side interface controller 41.

In an example in FIG. 10, the interface controller 13 of the host part 10 is a transmitting side interface controller, and the interface controller 41 of the HDD 40 is a receiving side interface controller. The receiving side interface controller 41 comprises a received signal diagnosis part (signal diagnosis means, signal waveform diagnosis part, waveform diagnosis part) 60C.

The received signal diagnosis part 60C comprises a undershoot detection circuit 61 and a data hold margin detection circuit 62. A bypass circuit (diagnosis information transfer circuit) 91 as well as the IDE bus 20 (refer to FIG. 1) is provided between the receiving side interface controller 41 and the transmitting side interface controller 13.

In such a configuration, the undershoot detection circuit 61 and the data hold margin detection circuit 62 receive an output data signal from the transmitting side IC 14, which signal is inputted via the IDE bus 20 to the interface controller 41 (, and the data hold margin detection circuit 62 also receives a clock signal).

Output signals from the undershoot detection circuit 61 and the data hold margin detection circuit 62 (undershoot detect signal S5, data hold margin detect signal S12) are then fed back as signals representing the diagnosis information, to the transmitting side interface controller 13 through the bypass circuit 91. In the interface controller 13, the transmitting side IC 14 determines whether it is necessary to modify the slew rate, based on the set value of slew rate that is outputted from the slew rate register 15, and on the output signals from the undershoot detection circuit 61 and the data hold margin detection circuit 62, which signals are fed back from the receiving side received signal diagnosis part 60C via the bypass circuit 91. Consequently, if it is necessary to modify the slew rate, the transmitting side IC 14 outputs a signal with a modified slew rate at the receiving side interface controller 41.

In an example shown in FIG. 11, the interface controller 13 of the host part 10 is a transmitting side interface controller, and the interface controller 41 of the HDD 40 is a receiving side interface controller. The receiving side interface controller 41 comprises a received signal diagnosis part (signal diagnosis means, signal waveform part, waveform diagnosis part) 60D.

The received signal diagnosis part 60D comprises an internal register (diagnosis information storage memory) 93 as well as the undershoot detection circuit 61 and the data hold margin detection circuit 62.

The undershoot detection circuit 61 and the data hold margin detection circuit 62 receive an output data signal from the transmitting side IC 14, which signal is inputted via the IDE bus 20 to the interface controller 41 (, and the data hold margin detection circuit 62 also receives a clock signal).

The undershoot detection circuit 61 and the data hold margin detection circuit 62 output signals related to a diagnosis result for the output data signal from the transmitting side IC 14 (undershoot detect signal S5, data hold margin detect signal S12) to write data corresponding to the output signals into the internal register 93.

In a PC system having such a configuration, a BIOS (Basic Input/Output System) or a driver (signal characteristic information update means: referred to as "BIOS/driver" in FIG. 11) 94 at the host part 10 reads out data written into the internal register 93. The BIOS or the driver 94 also rewrites the set value of slew rate written into the slew rate register 15 of the interface controller 13 based on the read out data if it is necessary to modify the slew rate of the signal that is outputted by the transmitting side IC 14.

While what executes a read process from the internal register 93 mentioned above, and a write process into the slew rate register 15 is referred to as BIOS or driver 94, if (OS: Operation System of) the PC system is operating, (a software of) a driver such as an interface driver provided in the host part 10 can execute directly the process described above, or the BIOS can execute the process described above based on instructions by an interface driver or the like. When POS is executed to start up the PC system, the BIOS executes the process.

In the configuration shown in FIG. 9 to FIG. 11, a calibration that is essentially same as shown in FIG. 8 can be executed by the calibration execution part 83 as shown in FIG. 1. Specifically, based on a signal from the attachment/detachment determination part 81 and the power supply monitoring part 82, at a time such as a time of POS right after the PC system is started up with the PC system powered on, a time right after the PC system returns to a normal mode from a sleep mode, or a time when it is detected that the CD-ROM drive 30 and the HDD 40 are attached to or detached from the respective connectors 30C and 40C with the PC system powered on, a data pattern for the calibration is transmitted, then the slew rate of the signal transmitted by the transmitting side IC 14 is modified based on the data pattern.

The steps S104 to S105 as shown in FIG. 8 are replaced in the case of FIG. 9 with a process of diagnosing by the received signal diagnosis part 60B provided in receiving side followed by issuing commands for a slew rate modification, or in the case of FIG. 10 with a process of diagnosing by the received signal diagnosis part 60C provided in receiving side followed by outputting a signal corresponding to the diagnosis result to the bypass circuit 91, or in the case of FIG. 11 with a process of diagnosing by the received signal diagnosis part 60D provided in receiving side followed by writing to the internal register 93.

While in the examples shown in FIG. 1 to FIG. 11, the cases where a data is transferred from the host part 10 to the HDD 40 are described as examples, it should be noted that the similar configurations are applicable for the case where a data is transferred from the HDD 40 or the CD-ROM drive 30 to the host part 10. For the example of FIG. 2, it is configured such that the interface controllers 31 and 41 of the CD-ROM drive 30 and the HDD 40 are transmitting side interface controllers as device side slew rate adjustment parts, and the transmitting side IC 14 is provided as a device side signal transmission part and the received signal diagnosis part 60A as a host side signal waveform diagnosis part, and the host part 10 is a receiving side interface controller, and the arrangement comprises the receiving side IC 42 as a host side signal reception part. To obtain such a configuration, each of the interface controllers 13, 31 and 41 of the host part 10, CD-ROM drive 30, the HDD 40 may have the configuration of the transmitting side interface controller and the configuration of the receiving side interface controller shown in FIG. 2, FIG. 9, FIG. 10 and FIG. 11.

Second Embodiment

FIG. 12 shows a second embodiment of a PC system according to the present invention. It shows an application for a data transfer via a PCI (Peripheral Component Interconnect) bus instead of the IDE bus 20 in the first embodiment. Elements similar to ones shown in the first embodiment will not described hereafter with same reference numerals being assigned.

As shown in FIG. 12, a PC system comprises a PCI bus (bus) 320 for connecting peripheral devices to the host part 10. The PCI bus 320 is provided with a PCI-Cardbus bridge 330 by which a PC card 331 (a card type peripheral device) can be removably attached in the system, and PCI slots (interfaces) 340A, 340B and 340C by which a board type peripheral device can be removably attached in the system. In this embodiment, an audio controller 350 is attached in the PCI slots 340A as a peripheral device (device), and a video controller 360 is attached in the PCI slot 340B.

In the host part 10, a host-PCI bridge 370 is disposed between a control chip set 17 to which the CPU 11 and the memory 12 are connected and PCI bus 320, to connect them to each other.

The audio controller 350 and the video controller 360 connected respectively to the PCI slot 340A and 340B comprise control parts 351 and 361, respectively, for managing the audio control function and video control function, and comprise signal input/output parts 352 and 362, respectively, for managing signals inputted to/outputted from the control parts 351 and 361.

In the PC system with such a configuration, a host-PCI bridge 370 of the host part 10, and signal input/output parts 352 and 362 of the audio controller 350 and video controller 360 have functions corresponding to "transmitting side interface controller" and "receiving side interface controller" described in the first embodiment with reference to FIG. 2 and FIG. 9 to FIG. 11.

For example, in the case where a data is transferred from the host part 10 to the audio controller 350 or the video controller 360, the host-PCI bridge 370 of the host part 10 (transmitting side) comprises the slew rate register 15, and the signal input/output parts 352 and 362 of the audio controller 350 and the video controller 360 (receiving side) have a configuration similar to any one of the received signal diagnosis part 60B, 60C and 60D as shown FIG. 9 to FIG. 11. As in the example shown in FIG. 2, the feedback circuit 50 may be provided between the host-PCI bridge 370 of the host part 10 and the signal input/output parts 352 and 362 of the audio controller 350 and the video controller 360, and the received signal diagnosis part 60A may be provided in host-PCI bridge 370's side.

According to the configuration described above, in a PC system wherein a data is transferred via the PCI bus 320 between the host part 10 and peripheral devices such as the audio controller 350 or the video controller 360, a configuration can also be achieved wherein the received signal diagnosis part 60A, 60B, 60C or 60D performs a diagnosis based on a signal received at the data receiving side and the set value at the transmitting side slew rate register 15 is modified depending on the diagnosis result, as in the first embodiment described above. Such a configuration provides a reception of a signal with a proper waveform at the receiving side, a stabilized waveform and prevention of data transfer error, and provides always a stable performance even if various peripheral devices are combined.

In such a configuration, the host part 10 may comprise the calibration execution part 83 shown in FIG. 1, as in the first embodiment described above. In this case, at a time such as a time of starting up of the PC system, a time right after the PC system returns from a sleep mode to a normal mode, or a time when it is detected by the detection means that the audio controller 350 or the video controller 360 is attached or detached with the power on, a calibration can be executed by the calibration execution part 83 and the set value at the transmitting side slew rate register 15 can be modified. Such a configuration allows better for hot-attachment.

While a data pattern transmitted by the host part 10 on the calibration may be any pattern, when a data is transferred with PCI bus master transfer, for example, the data pattern is preferably a strict data pattern with continuous 32 bit width pulse changes of signals like "00000000•FFFFFFFF•00000000•FFFFFFFF• . . . ".

While in the second embodiment described above, an example has been mentioned wherein the signal input/output parts 352 and 362 of the audio controller 350 and video controller 360 has a configuration similar to any one of the received signal diagnosis parts 60B, 60C and 60D, other portions can have such a configuration than the signal input/output parts 352 and 362 of the audio controller 350 and video controller 360. Such a configuration with such received signal diagnosis functions may be disposed between the PCI bus 320 and the PCI slots 340A, 340B and 340C rather than in peripheral devices such as the audio controller 350 and the video controller 360. The PCI-Cardbus bridge 330 can also have a configuration similar to any one of the received signal diagnosis part 60B, 60C and 60D.

The second embodiment has a configuration wherein a transmitting side interface controller is placed in the host part 10's side, and the receiving side interface controller is placed in the audio controller 350's side and the video controller 360's side (peripheral devices), and the receiving side controller issues a command to the transmitting side controller. However, on the PCI bus 320, since each controller can be a PCI master, any parts can issue a command. Therefore, it is possible to implement a configuration wherein a transmitting side interface controller is placed in the audio controller 350's side and the video controller 360's side (peripheral devices), and a receiving side interface controller is placed in the host part 10's side.

Third Embodiment

FIG. 13 shows a third embodiment of a PC system according to the present invention and shows a case in which a notebook type PC system comprises an expansion apparatus that can be removably attached to the main body. In the following description, elements similar to those shown in the first and second embodiment will not be described with same reference numerals being assigned.

As shown in FIG. 13, a PC system comprises a primary PCI bus (bus) 400 that connects peripheral devices to the host part 10 in the main body's side. The primary PCI bus 400 comprises a PCI Cardbus-bridge 330, and PCI slots 340A and 340B. In this embodiment, the audio controller 350 is attached to the PCI slot 340A, and the video controller 360 is attached to the PCI slot 340B.

The host-PCI bridge 370 is disposed in the host part 10 between the control chip set 17 to which the CPU 11 and the memory 12 are connected and the primary PCI bus 400, to connect them to each other.

The primary PCI bus 400 is provided with a docking connector (interface) 410, to which a docking station (a expansion apparatus) 420 can be removably attached.

The docking station 420 comprises a secondary PCI bus (docking station bus, internal bus) 430, which is connected through the PCI-PCI bridge 440 to the primary PCI bus 400 with the docking station 420 being connected to the docking connector 410.

The secondary PCI bus 430 comprises PCI connectors (docking station connectors) 450A and 450B for connecting several peripheral devices. Peripheral devices (devices) 451 and 452 such as various drives including a CD-ROM drive, or expansion HDD are removably attached to the PCI connectors 450A and 450B.

In the PC system with such a configuration, the host-PCI bridge 370 of the host part 10, and PCI-PCI bridge 440 have functions corresponding to "transmitting side interface controller" and "receiving side interface controller" described in the first embodiment with reference to FIG. 2 and FIG. 9 to FIG. 11.

For example, in the case where a data is transferred from the host part 10 to the peripheral device 451 or 452 attached to the docking station 420, the host-PCI bridge 370 of the host part 10 (transmitting side) comprises the slew rate register 15, and the PCI-PCI bridge 440 (receiving side) comprises a received signal diagnosis part 441 that is similar to any one of the received signal diagnosis part 60B, 60C and 60D shown in FIG. 9 to FIG. 11. Alternatively, as shown in FIG. 2, the feedback circuit 50 may be provided between the host-PCI bridge 370 of the host part 10 and the PCI-PCI bridge 440, and the received signal diagnosis part 60A may be provided in the host-PCI bridge 370's side.

According to such a configuration, in a PC system wherein a data is transferred through the primary PCI bus 400 and the secondary PCI bus 430, between the host part 10 and the peripheral devices 451 and 452 attached to the docking station 420, a configuration can be achieved wherein the received signal diagnosis part 441 of the docking station 420 performs a diagnosis based on a signal received in the data receiving side, and the set value at the slew rate register 15 (the transmitting side) is modified based on the diagnosis result, as in the first embodiment described above. Such a configuration provides a reception of a signal with a proper waveform in the receiving side, a stabilized waveform and prevention of data transfer errors, and provides always a stable performance even if various peripheral devices are combined.

In such a configuration, as in the first embodiment described above, the host part 10 may comprise the calibration execution part 83 as shown FIG. 1. In this case, at a time such as a time of starting up of the PC system, a time right after the PC system returns from a sleep mode to a normal mode, or a time when it is detected that the docking station 420 is attached/detached, or the peripheral device 451 or 452 is attached to/detached from the docking station 420 with the power on, as the second embodiment, the calibration execution part 83 can execute a calibration and modify the set value at the transmitting side slew rate register 15. This configuration allows better for hot-attachment.

While in the second and third embodiments the PCI-PCI bridge 440 comprises the received signal diagnosis 441 in the configurations, the received signal 441 may also be provided between the primary PCI bus 400 and the docking connector 410.

While in the first to third embodiments the received signal diagnosis part 60A, 60B, 60C, 60D and 441 have the undershoot detection circuit 61 and the data hold margin detection circuit 62 thereby detecting a undershoot and a data hold margin of a signal received at the receiving side, the circuit configuration may be any one that has a similar detection function.

While in the first to third embodiments, an undershoot and a data hold margin of a signal received at the receiving side are detected and the slew rate of the signal transmitted at the transmitting side is modified based on them in the configurations, if it is possible to stabilize the signal in the receiving side it may also be configured to modify resistance values of the termination resistors of the peripheral devices based on the detection results of the undershoot and the data hold margin of the signal received at the receiving side.

While in the embodiments described above, an undershoot and a data hold margin are detected as characteristics of the signal received at the receiving side in the configurations, an overshoot instead of the undershoot and a data setup time instead of the data hold margin may be detected.

It should be noted that in the first to third embodiments the names of the peripherals, which are employed as specific examples, are only examples and other peripheral devices can also be used.

While as examples, the IDE bus 20 is used in the first example described above, and the PCI bus 320 is used in the second embodiment, and the docking station 420 is used in the third embodiment, a PC system can be used wherein the first, second and third embodiments are properly combined.

In addition, it is possible to select any of the configurations described in the embodiments and to properly modify them to another configuration.

As described above, the present invention provides reception of a signal with proper waveform at a receiving side during a data transfer via a bus in a PC system, a stabilized waveform, and prevention of data transfer errors. Even if various peripheral devices are combined, it provides always a stable performance.

What is claimed is:

1. A data processing system, comprising:

a bus;

a signal transmitter for transmitting a data signal over said bus;

a signal receiver for receiving the data signal transmitted by said signal transmitter over said bus;

a signal diagnostic unit for detecting a distortion in the signal; and an adjustment unit for adjusting a characteristic of the data processing system in response to the distortion detected by said signal diagnostic unit;

wherein said signal transmitter includes said signal diagnostic unit and said adjustment unit; and further comprising a feedback circuit coupled between said signal receiver and said signal transmitter for feeding back the signal as received by said signal receiver to said signal transmitter, wherein said signal diagnostic unit detects distortion in the signal as received from said feedback circuit.

2. A data processing system, comprising:

a bus;

a signal transmitter for transmitting a data signal over said bus;

a signal receiver for receiving the data signal transmitted by said signal transmitter over said bus;

a signal diagnostic unit for detecting a distortion in the signal, wherein said signal receiver includes said signal diagnostic unit, said signal diagnostic unit detecting distortion in the signal as received by said signal receiver;

an adjustment unit for adjusting a characteristic of the data processing system in response to the distortion detected by said signal diagnostic unit, wherein said signal transmitter includes said adjustment unit;

a diagnostic information storage memory in which diagnostic information produced by said signal diagnostic unit is stored;

a signal characteristic information storage memory in which information about a characteristic of the signal transmitted by said signal transmitter is stored; and a signal characteristic information update unit for reading said diagnostic information from said diagnostic information storage memory and for updating information stored in said signal characteristic information storage memory based on said diagnostic information.

3. A computer system comprising:

a bus;

a host device including a signal transmitter for transmitting a signal over said bus, and further including a slew rate adjustment unit for adjusting the slew rate of the signal as transmitted by said signal transmitter;

a peripheral device including a signal receiver for receiving signals transmitted over said bus by said signal transmitter; and a signal waveform diagnostic unit for detecting distortion in the signal as received by said signal receiver;

wherein said host part further comprises a calibration execution part for executing with a predetermined time a calibration process to adjust with said slew rate adjustment part the slew rate of the signal transmitted by said signal transmission part, by transmitting a predetermined signal from said signal transmission part of the host part and diagnosing with said signal waveform diagnostic part the waveform of the signal received by said signal reception part of said peripheral device.

4. The computer system of claim 3, wherein said peripheral device can be removably attached to said bus, and said calibration execution part executes said calibration process upon detection of attachment of said peripheral device to said bus.

* * * * *